T. L. Tripp.
Rein Holder.
Nº 49,806. Patented Sept. 5, 1865.
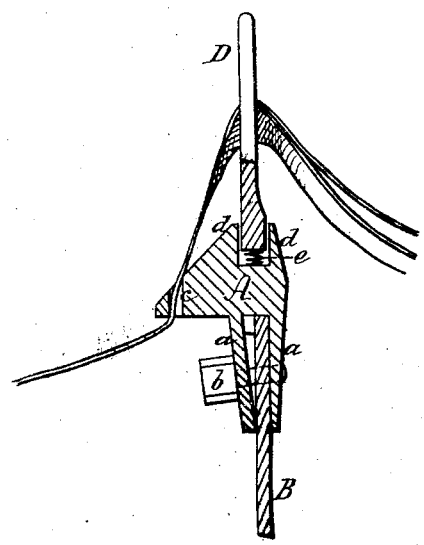
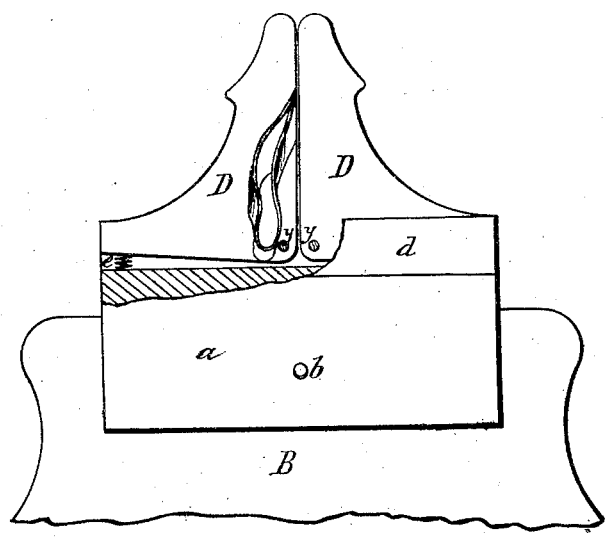
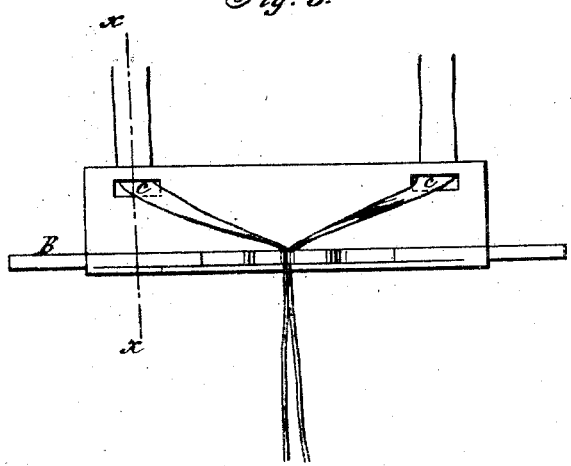
Witnesses
Theo Tusch
Wm Trewin
Inventor.
T. L. Tripp
By Munn & Co
Attys

UNITED STATES PATENT OFFICE.

T. L. TRIPP, OF PRESCOTT, WISCONSIN.

IMPROVEMENT IN REIN-HOLDERS.

Specification forming part of Letters Patent No. 49,806, dated September 5, 1865.

*To all whom it may concern:*

Be it known that I, T. L. TRIPP, of Prescott, in the county of Pierce and State of Wisconsin, have invented a new and Improved Device for Holding Reins or Harness-Lines; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken on the line $x\,x$, Fig. 3. Fig. 2 is a side view of my invention with a part broken away. Fig. 3 is a top view of the same.

Similar letters of reference indicate like parts.

Much annoyance and embarrassment is caused on leaving a horse and carriage standing for a time by the necessity of contriving some way of securing the reins in a manner that will prevent them getting under the horse's feet. The object, therefore, of my invention is to provide a simple device to be attached to the dash-board of a carriage, which will clamp the reins and hold them firmly until again required for driving the horse; and it consists in the construction of a wooden or metallic clamp which is to be secured to the dash-board of a carriage, and which has two jaws so arranged as to be pressed together by suitable springs, into which the reins are to be drawn, and where they will be firmly held until removed therefrom.

To enable others to understand my invention, I will proceed to describe it.

A represents the body of the device, having two projecting pieces, $a\,a$, sufficiently far apart to allow of their being placed over the dash-board B of the carriage, to which they are secured by a thumb-screw, $b$, passing through them and the dash-board, or by any other suitable device which will enable the rein-holders being removed when it is desired to do so. The front of the body A projects somewhat over the dash-board in front, and has two holes or slots, $c\,c$, through it sufficiently large to allow the reins being inserted through them. They are some distance apart, one on each side or end of the device, as shown in Fig. 3, and thus they (the reins) are prevented from being twisted or tangled together, which often happens when carelessly holding the reins while driving; and when it is necessary to suddenly draw upon one rein to guide the horse in a particular direction the reins are not in a condition to determine which one to pull upon without first untangling them.

D D are two jaws arranged upon the body A and pivoted thereto at the lower inner corners, as shown in Fig. 2 at $y\,y$. Guides $d\,d$ serve to confine them in position. A spiral or other suitable spring, $e$, is placed underneath the end of each jaw in such manner that said springs will press together at their upper ends, and thus compel them to hold the reins firmly when they are pushed down between them. The reins thus held will not be liable to fall down underneath the horse's feet, and they will be out of the reach of the horse's tail, so that they will not be drawn out of place. They can be quickly inserted in the jaws and as quickly withdrawn when needed for use.

The device is simple, and its application on the dash-board of a carriage does not in the least detract from its comely appearance. It is, withal, a very handy and a much-needed appendage to a carriage.

What I claim as my invention, and desire to secure by Letters Patent, is—

1. A device for holding the harness-reins consisting of the jaws D D, substantially as herein specified.

2. The combination of the jaws D D, body A, projecting jaws $a\,a$, spring $e$, substantially as shown and described.

3. Making holes or slots $c\,c$ in the body A, through which to pass the reins to prevent their becoming tangled and twisted, substantially as described.

T. L. TRIPP.

Witnesses:
J. C. BUTTON,
H. FELT.